United States Patent [19]

Tokunaga et al.

[11] Patent Number: 5,548,032

[45] Date of Patent: Aug. 20, 1996

[54] CROSSLINKING AGENT FOR ACRYLIC RUBBER

[75] Inventors: Terumitsu Tokunaga, Toyonaka; Michinori Kuraya, Nara-ken, both of Japan

[73] Assignee: Toyo Seal Kogyo Kabushiki Kaisha, Nara, Japan

[21] Appl. No.: 435,221

[22] Filed: May 5, 1995

Related U.S. Application Data

[63] Continuation of Ser. No. 40,342, Mar. 30, 1993, abandoned.

[51] Int. Cl.$^6$ .......................... C08C 19/22; C08C 19/20; C08F 8/34; C08F 8/32
[52] U.S. Cl. .......................... 525/352; 525/343; 525/351; 525/346; 525/374; 525/381; 525/472; 564/1.5; 564/32; 564/60; 564/61
[58] Field of Search .................................. 525/352, 374, 525/381, 343, 351, 472

[56] References Cited

U.S. PATENT DOCUMENTS

| | | | |
|---|---|---|---|
| 3,365,468 | 1/1968 | Feichtinger | 564/61 |
| 3,960,983 | 1/1976 | Blank | 525/496 |
| 4,248,985 | 2/1981 | Ohishi | 525/328.9 |
| 4,439,587 | 3/1984 | Martinez | 525/292 |
| 4,837,273 | 6/1989 | Wamprecht | 525/66 |
| 5,154,914 | 5/1979 | Kuraya | 526/39 |

*Primary Examiner*—Fred Zitomer
*Attorney, Agent, or Firm*—Varndell Legal Group

[57] ABSTRACT

A crosslinking agent suitable for acrylic rubbers, particularly for acrylic rubbers containing units of a cyanoacetic acid comonomer or a malonic acid comonomer for imparting a crosslinkability, which comprises a reaction product of formaldehyde or a polymerized formaldehyde with urea or thiourea in the presence of an acidic catalyst.

7 Claims, 1 Drawing Sheet

CROSSLINKING AGENT FOR ACRYLIC RUBBER

CROSS REFERENCE TO RELATED APPLICATIONS

This application is a continuation application of U.S. Ser. No. 08/040,342, filed Mar. 30, 1993, now abandoned.

BACKGROUND OF THE INVENTION

The present invention relates to a crosslinking agent suitable for use in curing acrylic rubbers.

It is known that acrylic rubbers are superior in heat resistance and oil resistance to general rubbers. Sulfur vulcanization is not applicable to the acrylic rubbers because they have no unsaturated double bond.

Therefore, in order to make crosslinkable, acrylic rubbers have been generally produced by copolymerizing alkyl acrylates with comonomers to impart a crosslinkability, e.g. halogen-containing monomers such as 2-chloroethyl vinyl ether and vinyl chloroacetate, or epoxy-containing monomers such as allyl glycidyl ether, glycidyl acrylate and glycidyl methacrylate, as disclosed in Japanese Patent Publication Kokoku No. 57843/1986. These acrylic rubbers are crosslinkable with a crosslinking agent or curing agent, e.g. a fatty acid soap or an amine compound such as triethylenetetramine or hexamethylenediamine carbamate.

However, these known acrylic rubbers have some defects. The acrylic rubbers prepared by copolymerization with the halogen-containing monomers have the defects that the water resistance is poor because the halogen has a reactivity to water, and that they cause prevulcanization of a mixed compound during roll processing or storage thereof because the reaction of the monomer units introduced to impart a crosslinkability with a crosslinking agent proceeds too fast. The acrylic rubbers prepared by copolymerization with the epoxy-containing monomers have no particularly serious defects, but still have problems that they are inferior in heat resistance to the halogen-containing acrylic rubbers and also are insufficient in water resistance and oil resistance and, therefore, they can not be satisfactorily applied to uses which require particularly superior properties.

There is also proposed by the present inventors an acrylic rubber crosslinkable with a thiuram compound, which is prepared by copolymerizing acrylic acid esters with a cyanoacetic acid compound or a malonic acid compound as a comonomer for imparting a crosslinkability, as disclosed in Japanese Patent Publication Kokoku No. 3770/1979 and No. 28437/1979. This acrylic rubber has good water and oil resistances and also has a heat resistance on the same level as that of conventional acrylic rubbers. However, since this acrylic rubber has been used with a thiuram crosslinking agent which has a relatively low activation energy, it leaves room for improvement of heat resistance.

It is an object of the present invention to provide a curable composition capable of providing an acrylic rubber having excellent water resistance, oil resistance and heat resistance.

Another object of the present invention is to provide a crosslinking agent suitable particularly for use in acrylic rubbers containing units of a cyanoacetic acid monomer or a malonic acid monomer as crosslinking sites, thus giving cured acrylic rubbers having an improved heat resistance as well as excellent water and oil resistances.

These and other objects of the present invention will become apparent from the description hereinafter.

SUMMARY OF THE INVENTION

It has been found that a product obtained by a reaction of formaldehyde or a polymerized formaldehyde with urea or thiourea in the presence of an acidic catalyst is useful as a crosslinking agent for acrylic rubbers, particularly acrylic rubbers containing units of a cyanoacetic acid or malonic acid monomer, and when the acrylic rubbers are cured using this reaction product as a crosslinking agent, cured acrylic rubbers having an improved heat resistance and excellent water and oil resistances are obtained.

In accordance with the present invention, there is provided a crosslinking agent for acrylic rubbers comprising a reaction product of a compound selected from the group cosisting of formaldehyde and a polymerized formaldehyde and a compound selected from the group consisting of urea and thiourea in the presence of an acidic catalyst.

DETAILED DESCRIPTION

Figure 1:
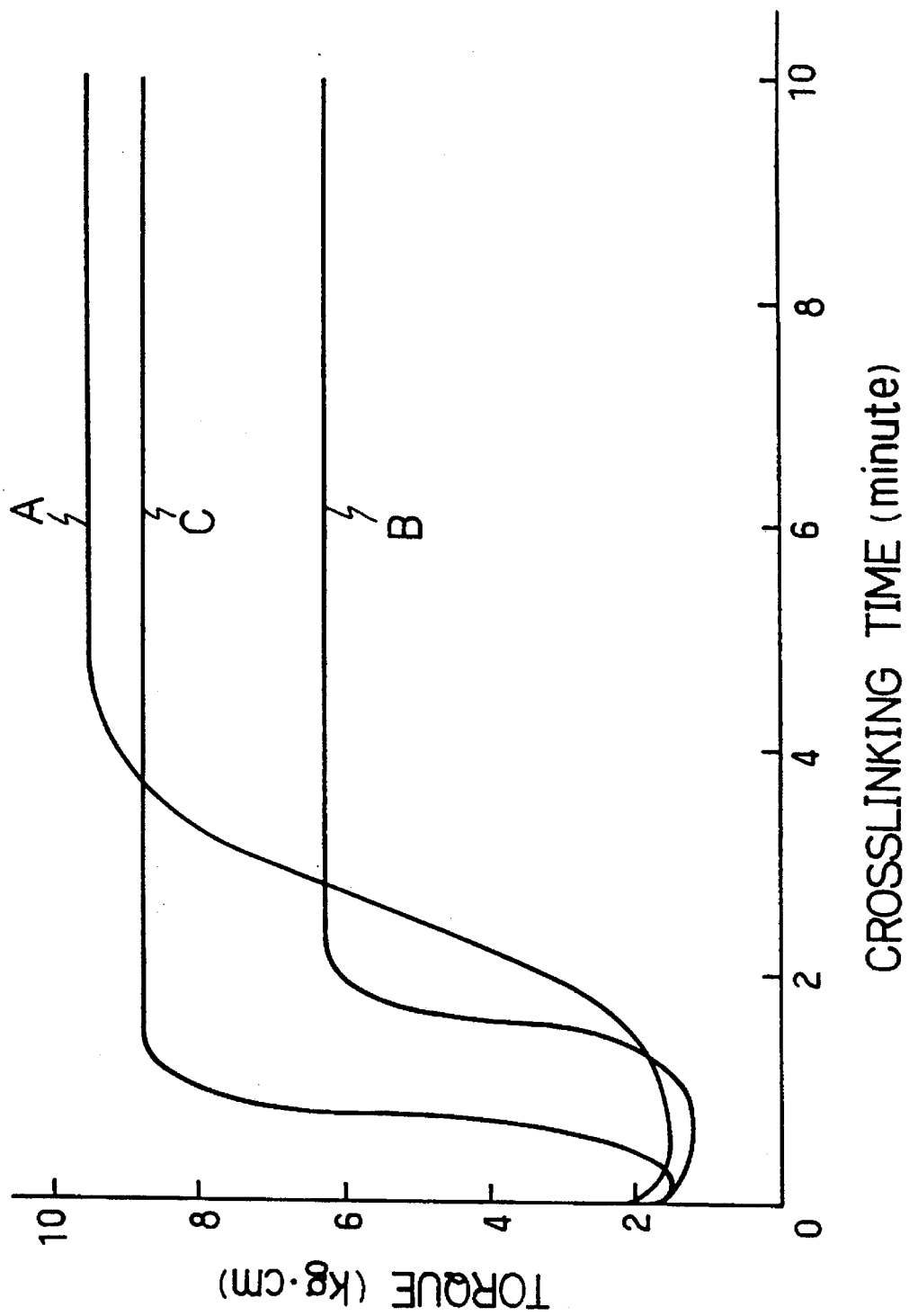
FIG. 1 is a graph showing the state of crosslinking of an acrylic rubber cured with a crosslinking agent according to the present invention, an acrylic rubber cured with a thiuram crosslinking agent and an acrylic rubber cured with hexamethylenetetramine.

The crosslinking agent of the present invention is prepared by reacting formaldehyde and/or a polyformaldehyde with urea and/or thiourea in the presence of an acidic catalyst. When these compounds are reacted in the presence of an acidic catalyst, a condensation polymerization occurs. Since the reaction rate is high, the reaction product is obtained as a derivative of methyleneurea or methylenethiourea.

Various polyformaldehydes (polymerized formaldehyes having various degrees of polymerization) as generally shown by the formula: $HO(CH_2O)_nH$ wherein n is an integer of not less than 3, can be used in the present invention. Usually, paraformaldehyde is used as the polyformaldehyde.

Inorganic acids and organic acids can be used as the acidic catalysts. Representative examples of the acidic catalyst used in the present invention are, for instance, hydrochloric acid, phosphoric acid, formic acid and acetic acid.

The reaction is usually carried out in an aqueous medium, typically water. The reaction temperature is usually from 5° to 90° C., and the reaction time is usually from 10 to 60 minutes.

Theoretically, it is sufficient to use the formaldehyde compound and the urea compound in equimolar ratio. However, in consideration of evaporation of formaldehyde during the reaction, purity of available formalin and the like, it is preferred to use the formaldehyde and/or polyformaldehyde in excess. In general, formaldehyde, polyformaldehyde or a mixture thereof is used in an mount of 1 to 10 moles, preferably 1.1 to 2.5 moles, per mole of urea, thiourea or a mixture thereof.

The thus obtained reaction product is used as the crossliking agent for acrylic rubbers. The reaction product is a water-insoluble white powder and is obtained as a high molecular weight compound and, therefore, it is easy to handle. Moreover, it has no formalin odor.

In the reaction product, the portion derived from the formaldehyde compound functions to crosslink acrylic rubbers, and the portion derived from the urea compound functions to control the rate of crosslinking reaction caused by the formaldehyde portion. Since the crosslinking agent of the present invention contains the portion derived from the urea compound, it has the features that the crosslinking reaction does not proceed at a too fast rate and consequently the prevulcanization of a mixed compound does not occur.

The crosslinking agent of the present invention also has the advantage that acrylic rubbers cured therewith do not cause a decomposition reaction of sulfur molecule, which has a relatively low activation energy, at high temperatures as seen in acrylic rubbers cured by a sulfur type crosslinking agent such as thiuram and, therefore, the cured rubbers have an improved excellent heat resistance. Also, the water resistance and oil resistance that acrylic rubbers possess in itself are not impaired.

A reaction of urea and formalin has been made in the preparation of a urea-formaldehyde resin. In that case, the reaction is generally carried out in the presence of a basic catalyst, and a methylolurea compound is produced. The reaction product of methyleneurea derivative type according to the present invention prepared in the presence of an acidic catalyst and used as the crosslinking agent is distinct from the methylolurea products in the preparation of urea resin.

The crosslinking agent of the present invention is applicable to various known acrylic rubbers curable with thiuram crosslinking agents to improve the heat resistance. It is particularly useful for acrylic rubbers containing units derived from a cyanoacetic acid or malonic acid comonomer, preferably those prepared by copolymerization of an acrylic acid ester and 2 to 10% by weight, especially 2 to 6% by weight, based on the acrylic acid ester, of a cyanoacetic acid or malonic acid comonomer, as disclosed in U.S. Pat. No. 4,154,914.

Representative examples of the acrylic acid esters are, for instance, an alkyl acrylate such as methyl acrylate, ethyl acrylate, butyl acrylate or 2-ethylhexyl acrylate, an alkoxyalkyl acrylate such as methoxyethyl acrylate or ethoxyethyl acrylate, and the like. Alkyl acrylates having a $C_1$ to $C_8$ alkyl group and alkoxyalkyl acrylates having a $C_2$ to $C_8$ alkoxyalkyl group wherein the alkoxy group has 1 to 4 carbon atoms are generally used. These acrylic acid esters may be used alone or in admixture thereof.

The cyanoacetic acid or malonic acid comonomers are malonic acid derivatives represented by the formula:

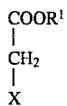

wherein $R^1$ is vinyl, allyl or methallyl group, and X is CN or $COOR^2$ in which $R^2$ is methyl, ethyl or propyl group. Representative examples of the malonic acid derivatives are, for instance, methyl allyl malonate, ethyl allyl malonate, allyl cyanoacetate, methallyl cyanoacetate, an ester of cyanoacetic acid with hydroxyethyl acrylate or methacrylate, and other cyanoacetic acid esters and malonic acid esters having a copolymerizable double bond.

The acrylic rubbers containing units of a cyanoacetic acid monomer or a malonic acid monomer are crosslinkable with hexamethylenetetramine or paraformaldehyde which decomposes to produce formaldehyde by heating for crosslinking. They are also crosslinkable with N,N'-dimethylolurea as obtained by the above-mentioned reaction of urea and formalin in the presence of a basic catalyst. In these cases, however, the crosslinking reaction is too fast and consequently the prevulcanization occurs. Moreover, bad formalin smell is given out during the working for crosslinking. The crosslinking with hexamethylenetetramine also has the fatal defect that the dispersibility in roll processing is bad.

In contrast, the crosslinking agent according to the present invention does not decompose to produce formaldehyde at the time of crosslinking acrylic rubbers because formaldehyde or a polyformaldehyde is intramolecularly fixed with urea or thiourea. Consequently, it has a good rising in crosslinking rate and a good plateau effect as shown by curve A in FIG. 1 which shows the state of crosslinking of an acrylic rubber. The crosslinking agent according to the present invention does not cause prevulcanization and has a good storage stability. Moreover, it does not generate a formalin odor during the crosslinking operation. Further, it has a good dispersibility in roll processing.

FIG. 1 is a graph showing the state of crosslinking of an acrylic rubber containing cyanoacetic acid comonomer units when the rubber is cured with the crosslinking agent according to the present invention, a thiuram crosslinking agent or hexamethylenetetramine, wherein the abscissa indicates the crossliking time (minute) and the ordinate indicates the torque of the rubber (kg·cm). In FIG. 1, curve A is a curing curve obtained when using the crosslinking agent of the present invention, curve B is a curing curve obtained when using the thiuram crosslinking agent, and curve C is a curing curve obtained when using hexamethylenetetramine as a crosslinking agent. The detail of the acrylic rubber used in the experiments is shown in Example 1, paragraph (B), described after. The detail of the crosslinking agent of the present invention and the formulation of a rubber composition for curve A is shown in Example 1, paragraphs (A) and (C), described after. The detail of the crosslinking agents and the formulation of rubber compositions for curves B and C is also shown in Comparative Examples 1 and 2 described after, respectively.

In case of the thiuram crosslinking agent, since there is an induction period until the torque begins to rise as shown by curve B, the storage stability and the safety in processing are good. However, curve B shows that the rise of torque is not so large and, therefore, the crosslinking density is not high. These results show that the physical properties of the cured product such as compression set are not good. In order to increase the crosslinking density, the amount of the crosslinking monomer to be copolymerized in the acrylic rubber must be increased as well as the amount of the crosslinking agent to be used.

In case of using hexamethylenetetramine as a crosslinking agent, the crosslinking density is high and physical properties such as compression set are good, as understood from curve C. However, the storage stability and the safety in processing are poor because of abrupt rising of the torque-time curve in a short period of time after starting the crosslinking.

In contrast, curve A shows that the crosslinking agent of the present invention provides cured products having a high crosslinking density and good physical properties such as compression set by the use of a slight amount thereof, and also has good storage stability and processing safety because of no abrupt rising of torque.

The mount of the crosslinking agent according to the present invention can be selected from a wide range in accordance with purposes. Although it also varies depending on the content of a crosslinking monomer incorporated in acrylic rubbers, the crosslinking agent according to the present invention is usually employed in an amount of 1 to 15 parts by weight, especially 1 to 8 parts by weight, per 100 parts by weight of an acrylic rubber. This range is preferred from the viewpoints of rate of crosslinking reaction, storage stability, processing safety, and physical properties of cured products such as mechanical properties, heat resistance and compression set. When the amount of the crosslinking agent is less than the above range, the rate of crosslinking reaction is lowered and it is hard to obtain cured products having satisfactory physical properties. When the amount is more than the above range, the rate of crosslinking reaction generally increases, but the storage stability, processing safety and general physical properties of cured rubbers are often impaired.

The crosslinking agent according to the present invention may be used in combination with known vulcanizing agents or vulcanization accelerators used for general rubbers, such as 2-(morpholinothio)benzothiazole, morpholine disulfide and 2-(4'-morpholinodithio)benzothiazole in order to adjust the rate of crosslinking reaction. These compounds are used in an amount effective to control the rate of crosslinking reaction, usually in an amount of 0 to 10 parts by weight, especially 0.1 to 2 parts by weight, per 100 parts by weight of the acrylic rubber.

The crosslinking agent is added to an acrylic rubber together with usual additives such as reinforcing agent and filler and other additives optionally employed such as antioxidant, plasticizer, lubricant and processing aid. After mixing them through a usual means such as a roll mill or a Banbury mixer, the resulting mixed compound is cured under heat and pressure to crosslink the rubber. The curing temperature is on the same level as that adopted to usual crosslinking agents, and it is usually selected from about 120° to about 250° C., especially about 150° to about 200° C.

Acrylic rubbers cured with the crosslinking agent according to the present invention have excellent characteristics such as mechanical properties, compression set, weathering resistance, ozone resistance and electric properties as well as heat resistance, oil resistance and water resistance. Accordingly, they can be effectively utilized for various uses, e.g. various kinds of sealing materials such as gasket, packing, O-ring and oil seal, various kinds of hoses, covering materials, various kinds of belts and various kinds of rolls.

Also, since the crosslinking agent according to the present invention is a white powder, it is applicable to not only black compounds, but also colored compounds. The crosslinking agent according to the present invention has the advantage in this respect.

The present invention is more specifically described and explained by means of the following Examples, in which all parts and % are by weight unless otherwise noted. It is to be understood that the present invention is not limited to the Examples.

EXAMPLE 1

(A) In 200 parts of water was dissolved 100 parts of urea, and thereto were added 1.7 parts of sodium laurylsulfonate as an emulsifier, 167 parts of 37% formalin and 1 part of 35% hydrochloric acid as a catalyst in that order. Exothermic reaction was started at 25° C. and continued for 20 minutes. The obtained reaction product was filtered and dried to give a white powder to be used as a crosslinking agent according to the present invention.

(B) A reactor was charged with 200 parts of water, and thereto were added 0.5 part of sodium laurylsulfonate and 2 parts of polyoxyethylene lauryl ether as an emulsifier. To the reactor were further added 5 parts of allyl cyanoacetate, 0.05 part of potassium persulfate and 0.05 part of sodium hydrogensulfite, and the temperature was elevated with introducing nitrogen gas into the reactor. The emulsion polymerization was carried out at 60° C. with intermittently adding 95 parts of ethyl acrylate over 30 minutes to give an acrylic rubber.

(C) To 100 parts of the obtained acrylic rubber were added 50 parts of MAF carbon (commercially available under the trade mark "Seast" #116 from Tokai Denkyoku Kabushiki Kaisha), 1 part of stearic acid, 2 parts of a substituted diphenylamine, 4 parts of the crosslinking agent obtained in the above (A), and 0.5 part of morpholine disulfide as crosslinking accelerator. The mixture was kneaded sufficiently in an open roll. It was then press-cured at 170° C. for 15 minutes to produce a rubber sheet, and subjected to postcure at 150° C. for 8 hours. Morpholinedisufide itself has no crosslinking action, but serves to control the crosslinking reaction rate.

The physical properties of the thus cured acrylic rubber under the ordinary state were measured according to JIS K 6301. The results are shown in Table 1.

The air-oven aging test at 177° C. for 70 hours, oil resistance test at 150° C. for 70 hours, water resistance test at 100° C. for 70 hours and measurement of compression set of the cured acrylic rubber were also made according to JIS K 6301. The results are also shown in Table 1.

EXAMPLE 2

The procedure of Example 1 was repeated except that 127 parts of thiourea was employed instead of 100 parts of urea to give a crosslinking agent.

The cured acrylic rubber was estimated in the same manner as in Example 1. The results are shown in Table 1.

Comparative Example 1

The same acrylic rubber as used in Example 1 was cured and tested in the same manner as in Example 1 except that 2 parts of tetramethylthiuramdisulfide and 2 parts of dibenzothiazyl disulfide were used instead of 4 parts of the crosslinking agent obtained in (A) of Example 1.

The results are shown in Table 1.

Comparative Example 2

An acrylic rubber containing units derived from an epoxy monomer (commercially available under the trade mark "Nipol AR-51" from Nippon Zeon Co., Ltd. ) was compounded and cured in the same manner as in Example 1 except that 3 parts of ferric dimethyldithiocarbamate was used as the crosslinking agent instead of the crosslinking agent obtained in (A) of Example 1.

The results are shown in Table 1.

Comparative Example 3

An acrylic rubber containing units derived from a halogen-containing monomer (commercially available under the trade mark "Nipol AR-71" from Nippon Zeon Co., Ltd.) was cured in the same manner as in Example 1 except that 0.3 part of sulfur, 0.5 part of potassium stearate and 3.2 parts of sodium stearate were used as the crosslinking agent instead of the crosslinking agent obtained in (A) of Example 1.

The results are shown in Table 1.

TABLE 1

| Test name and conditions | Test item | Ex. 1 | Ex. 2 | Com. Ex. 1 | Com. Ex. 2 | Com. Ex. 3 |
|---|---|---|---|---|---|---|
| Physical properties under ordinary state | Hardness (JIS-Hs) | 73 | 69 | 67 | 64 | 57 |
| | Tensile strength (kg/cm$^2$) | 138 | 144 | 123 | 131 | 127 |
| | Elongation (%) | 220 | 250 | 340 | 500 | 540 |
| Air-oven aging 177° C. × 70 hours | Hardness (JIS-Hs) | 74 | 72 | 73 | 75 | 62 |
| | Tensile strength (kg/cm$^2$) | 128 | 137 | 94 | 48 | 91 |
| | Elongation (%) | 250 | 280 | 350 | 526 | 460 |
| Oil resistance Dipping in JIS-No. 1 oil 150° C. × 70 hours | Hardness (JIS-Hs) | 70 | 65 | 60 | 65 | 54 |
| | Tensile strength (kg/cm$^2$) | 145 | 153 | 117 | 129 | 137 |
| | Elongation (%) | 270 | 300 | 390 | 410 | 410 |
| | Changing rate in volume (%) | −1.0 | −1.1 | −0.6 | −1.5 | −0.9 |
| Oil resistance Dipping in JIS-No. 3 oil 150° C. × 70 hours | Hardness (JIS-Hs) | 56 | 51 | 45 | 49 | 39 |
| | Tensile strength (kg/cm$^2$) | 119 | 128 | 96 | 120 | 127 |
| | Elongation (%) | 280 | 330 | 430 | 540 | 580 |
| | Changing rate in volume (%) | +12.5 | +12.7 | +13.2 | +11.2 | +14.7 |
| Water resistance 100° C. × 70 hours | Hardness (JIS-Hs) | 65 | 58 | 58 | 50 | 46 |
| | Tensile strength (kg/cm$^2$) | 118 | 127 | 106 | 116 | 99 |
| | Elongation (%) | 230 | 290 | 288 | 530 | 330 |
| | Changing rate in volume (%) | +9.1 | +9.4 | +8.9 | +20.4 | +32.4 |
| Compression set, 150° C. | 22 hours (%) | 28.5 | 34.1 | 40.8 | 51.3 | 33.9 |
| | 70 hours (%) | 40.7 | 45.5 | 57.6 | 66.4 | 42.8 |
| | 168 hours (%) | 54.5 | 62.7 | 72.5 | 75.4 | 52.9 |

As apparent from the results shown in Table 1, the acrylic rubbers cured with the crosslinking agent according to the present invention in Examples 1 and 2 have a high tensile strength even after the air-oven aging test under such severe conditions as 177° C.×70 hours, and is superior in heat resistance to the cured rubbers obtained in Comparative Examples 1 to 3.

Also, in the oil resistance tests, the cured rubbers obtained in Examples 1 and 2 show a volume changing rate on the same level as those of Comparative Examples 1 to 3, and no decrease in physical properties due to off is seen. Thus, it is understood that the cured rubbers of Examples 1 and 2 have an excellent oil resistance.

In the water resistance test, the cured rubbers obtained in Examples 1 and 2 show a volume changing rate on the same level as that of Comparative Example 1 and show a less volume changing rate than those of Comparative Examples 2 and 3. Thus, it is understood that the cured rubbers of Examples 1 and 2 have an excellent water resistance. In particular, the halogen-containing acrylic rubber in Comparative Example 3 shows a large volume changing rate in water resistance test, and is poor in water resistance.

The cured rubber obtained in Examples 1 and 2 have a Compression set on the same level as that of the halogen-containing acrylic rubber which is known to have the lowest compression set among known acrylic rubbers, and accordingly are superior in this respect.

In addition to the ingredients used in the Examples, other ingredients can be used in the Examples as set forth in the specification to obtain substantially the same results.

What we claim is:

1. A composition for crosslinking acrylic rubber comprising (A) a crosslinking agent consisting essentially of a reaction product of a compound selected from the group consisting of formaldehyde and a polymerized formaldehyde and a compound selected from the group consisting of urea and thiourea in the presence of an acid catalyst, and (B) a vulcanization accelerator.

2. The composition of claim 1, wherein said polymerized formaldehyde is paraformaldehyde.

3. The composition of claim 1, wherein said acidic catalyst is an inorganic or organic acid.

4. The composition of claim 1, wherein said acidic catalyst is a member selected from the group consisting of hydrochloric acid, phosphoric acid, formic acid and acetic acid.

5. The composition of claim 1, wherein said reaction product is a product obtained by the reaction at a temperature of 5° to 90° C. for 10 to 60 minutes.

6. The composition of claim 1, wherein said component (B) is at least one member selected from the group consisting of 2-(morpholinothio)benzothiazole, morpholine disulfide and 2-(4'-mopholinodithio)benzothiazole.

7. The composition of claim 1, wherein said crosslinking agent is a water-insoluble white powder.

* * * * *